United States Patent
Mazzarese et al.

(10) Patent No.: US 6,532,773 B1
(45) Date of Patent: Mar. 18, 2003

(54) METHOD OF MODIFYING THE INDEX PROFILE OF AN OPTICAL FIBER PREFORM IN THE LONGITUDINAL DIRECTION

(75) Inventors: David J Mazzarese, Warren, MA (US); George E Oulundsen, Belchertown, MA (US); Joseph T Sledziewski, Jr., Warren, MA (US)

(73) Assignee: Fitel USA Corp., Norcross, GA (US)

(*) Notice: Subject to any disclaimer, the term of this patent is extended or adjusted under 35 U.S.C. 154(b) by 181 days.

(21) Appl. No.: 09/609,580

(22) Filed: Jun. 30, 2000

(51) Int. Cl.$^7$ ............................................. C03B 37/018
(52) U.S. Cl. ............................ 65/378; 65/382; 65/417; 65/429
(58) Field of Search ...................... 65/429, 417, 378, 65/382

(56) References Cited

U.S. PATENT DOCUMENTS

| | | | | |
|---|---|---|---|---|
| 4,161,656 A | * | 7/1979 | Marcuse et al. | 250/459.1 |
| 4,181,433 A | * | 1/1980 | Marcuse | 356/128 |
| 4,217,027 A | | 8/1980 | MacChesney et al. | 350/96.3 |
| 4,260,221 A | * | 4/1981 | Marcuse | 385/124 |
| 4,292,341 A | * | 9/1981 | Marcuse et al. | 427/10 |
| 4,334,903 A | | 6/1982 | MacChesney et al. | 65/3.12 |
| 4,557,561 A | | 12/1985 | Schneider et al. | 350/96.34 |
| 4,793,843 A | * | 12/1988 | Pluijms et al. | 65/31 |
| 5,683,486 A | * | 11/1997 | Oyamada et al. | 65/377 |
| 5,761,366 A | | 6/1998 | Oh et al. | 385/127 |
| 5,958,102 A | * | 9/1999 | Shimada et al. | 65/382 |
| 5,993,899 A | | 11/1999 | Robin et al. | 427/163.2 |
| 6,098,428 A | * | 8/2000 | Bogdahn et al. | 65/381 |
| 6,131,414 A | * | 10/2000 | Shimizu et al. | 65/378 |

FOREIGN PATENT DOCUMENTS

| | | | |
|---|---|---|---|
| DE | 2714804 | 10/1977 | |
| EP | 0484035 | 5/1992 | |
| SU | 1150537 | * 4/1985 | 65/429 |

OTHER PUBLICATIONS

Presby, et al., "Calculation of bandwidth from index profiles of optical fibers. 2: Experiment," Applied Optics, Oct. 1, 1979, vol. 18, No. 19.

Optical Fiber Telecommunications II, Miller, et al. eds., 1998, Academic Press, Inc., San Diego, CA, pp. 156–262.

* cited by examiner

Primary Examiner—John Hoffman
(74) Attorney, Agent, or Firm—Sutherland Asbill & Brennan LLP

(57) ABSTRACT

The refractive index profile of a multimode optical preform, fabricated by MCVD for example, is modified in the longitudinal direction by removing selected amounts of core material from the wall of a central hole through the preform prior to collapse. The amount of core material to be removed is determined by measuring the refractive index profiles of optical fibers drawn from a number of precursor preforms at various locations along the length of the drawn fibers, averaging their profiles, and then comparing those averages with a desired profile. The refractive index profile is indirectly measured by bandwidth measurements, which are related to the alpha value a selected parameter (e.g., bandwidth) at various locations along the length of a fiber drawn from a previously fabricated preform. This parameter is then compared with desired values of that parameter at the various locations, and the differences are used to calculate the amount of core material that needs to be removed. Selective core material removal is accomplished by moving a torch along the length of the preform and flowing an etchant gas, such as a mixture of oxygen and $SF_6$, through the central hole in the preform. Selective etching is accomplished by varying the flow rate and/or the concentration of the etchant gas and/or the torch speed as a function of the location of the torch along the length of the preform.

24 Claims, 4 Drawing Sheets

METHOD OF MODIFYING THE INDEX PROFILE OF AN OPTICAL FIBER PREFORM IN THE LONGITUDINAL DIRECTION

TECHNICAL FIELD

This invention relates to a method of preparing preforms for optical fibers and, more particularly, to a method of varying the refractive index of the central portion of an optical preform.

BACKGROUND OF THE INVENTION

Modified Chemical Vapor Deposition (MCVD) is a widely-used process for fabricating preforms wherein successive layers of cladding and core material are deposited on the inside surface of a substrate tube, which is made from high quality glass. Individual layers of deposited material are turned into glass (vitrified) by a torch that moves back and forth along the length of the tube. The core material generally includes germanium, which raises the index of refraction of the glass according to the amount of germanium present. In this manner, a refractive index profile can be shaped to guide lightwaves in the axial direction of the optical fiber that is made from the preform. Different refractive index profiles affect the guided light in different ways.

Axial variations in the refractive index profile are difficult to control in optical fiber preforms, and frequently cause the optical fibers drawn therefrom to depart from their design specification. For example, multimode fibers include a central region of radius (a), referred to as the core, where substantially all of the propagating light is confined. Within the core region, the magnitude of the refractive index (n) varies as a function of radial distance (r) from the center of the fiber according to the equation $n=n_o[1-2\Delta(r/a)^\alpha]^{1/2}$. Ideally, the magnitude of $\alpha$ remains constant over the length of the fiber, but this is not the case. For a variety of reasons including variations in the composition of the precursor gasses during the deposition of core material, $\alpha$ varies along the length of the preform and the refractive index profile of the fiber is changed accordingly. Multimode fiber bandwidth is critically dependent of the value of $\alpha$, and extremely small fluctuations can reduce the bandwidth by very large amounts. See e.g., Calculation Of Bandwidth From Index Profiles Of Optical Fibers, *Applied Optics*, Oct. 1, 1979 by H. M. Presby, et al.

U.S. Pat. No. 5,993,899 describes a technique to produce a radial index profile uniformly in the longitudinal direction by varying the velocity of the gas introduction into the deposition tube. However, this involves a detailed understanding of how the gas velocity into the tube influences the deposition process and it requires a method of monitoring and controlling the velocity of the gas into the deposition tube.

A related technique that has been used to reduce the alpha axial trend in multimode fiber is an algorithm that varies the torch traverse speed as a function of axial preform position and core pass number in order to control the amount of glass being deposited at a particular position. This technique is known as the Multiple Traverse Speed tuning algorithm. And while it provides significant improvement for a large portion of the preform, it does not work well at the intake and exhaust regions of the preform.

Accordingly, it is desirable to provide an improved technique for controlling the axial bandwidth and alpha trend along the entire length of an optical preform and to control fluctuations of the core diameter in both singlemode and multimode preforms.

SUMMARY OF THE INVENTION

An optical preform having a desired refractive index profile in its longitudinal direction, is fabricated by first making a precursor preform having a central hole in the longitudinal direction that is surrounded by core material having the approximate desired refractive index profile. The central hole is collapsed and then a length of fiber is drawn from the preform. The refractive index profile is measured at various locations along the length of the drawn fiber. Based on the differences between the desired refractive index profile and the measured refractive index profile, calculations are made regarding the amount of core material that needs to be removed at the various different locations. Thereafter, a second optical preform is fabricated that is similar to the precursor preform, and an etchant gas is used to remove the calculated amounts of core material necessary to cause the second preform to have a refractive index profile that is similar to the desired refractive index profile along its length.

In an illustrative embodiment of the invention, the desired refractive index profile is relatively constant along the entire length of the preform, and the refractive index, n, of the core varies as a function of radius, r, in accordance with the equation: $n=n_o[1-2\Delta(r/a)^\alpha]^{1/2}$. In the illustrative embodiment of the invention, $\alpha \approx 2$ and, hence, the profile is approximately parabolic. Moreover, since bandwidth of the fiber is related to the $\alpha$ value, then measurements of bandwidth pretty well define the refractive index profile. Accordingly, in the illustrative embodiment, bandwidth measurements of the fiber are made to determine refractive index profile.

Also in the illustrative embodiment, $SF_6$ and oxygen are flowed through the central hole in the second preform to perform etching. The amount of etching performed at various locations along the length of the preform is varied by changing the quantity of $SF_6$ flowing through the central hole and/or the traverse speed of the torch.

Finally, in the illustrative embodiment, a number of precursor preforms are used to determine average refractive index profiles at the various locations and these averages are then used to determine the amount of core material that needs to be removed in subsequent preforms.

BRIEF DESCRIPTION OF THE DRAWING

The invention and its mode of operation will be more clearly understood from the following detailed description when read with the appended drawing in which.

TERMINOLOGY

Figure 1:
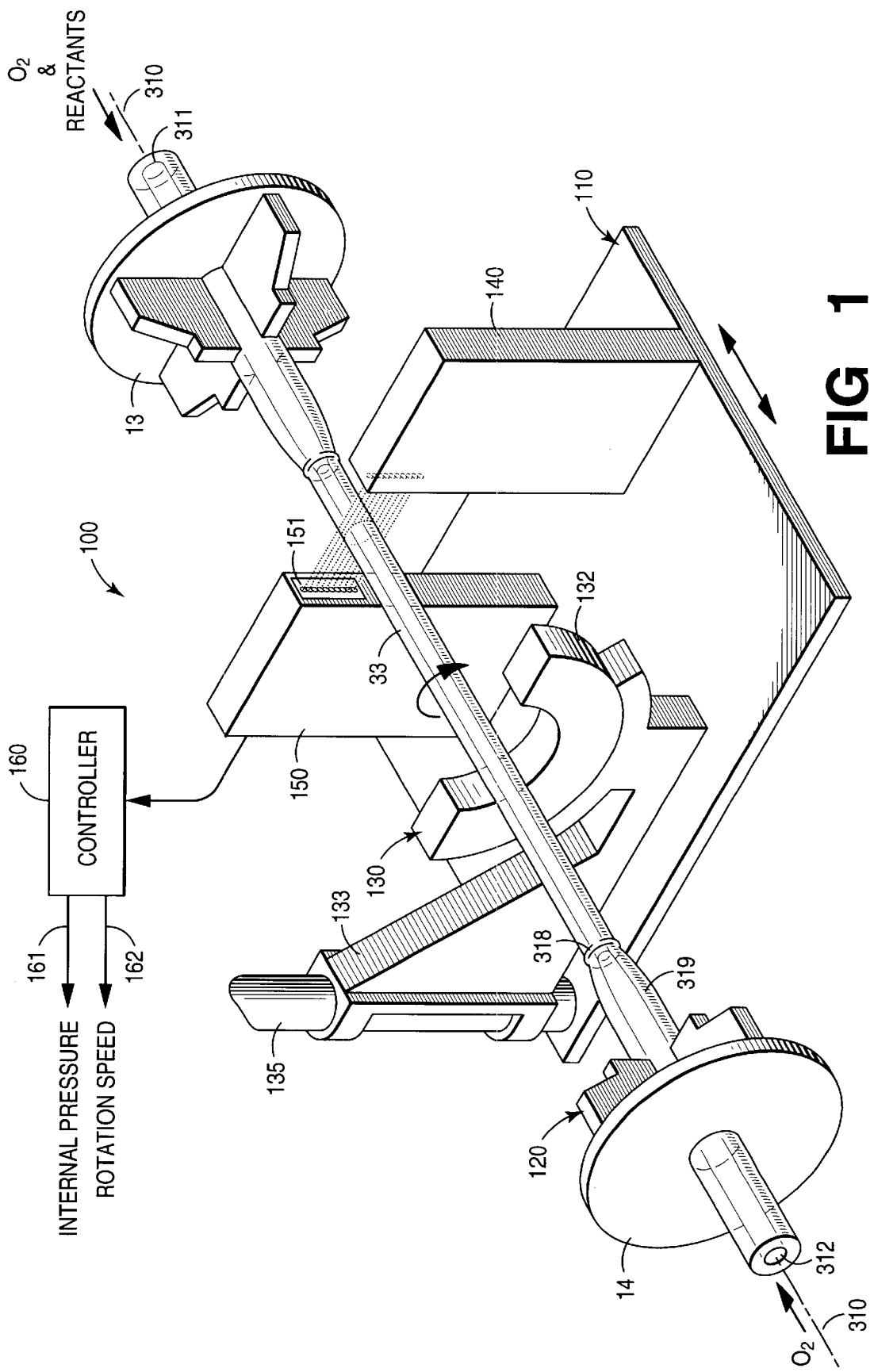
FIG. 1 is a perspective view of a glass-working lathe that includes a torch assembly for heating a glass substrate tube, and a machine-vision system for straightening the glass tube after it has been heated.

The following definitions are in accord with common usage in the art:

α profile—Refractive index profile defining the fiber core according to the equation:

$$n = n_o[1 - 2\Delta(r/a)^\alpha]^{1/2} \qquad (1)$$

wherein: n=refractive index at fiber radius r $n_{cl}$=refractive index of the cladding $n_o$=refractive index in the innermost core $\Delta \approx (n_o - n_{cl})/n_o$ (for small values of $\Delta$)

a=core radius

α=the exponent that describes the shape of the refractive index profile

Bandwidth—The bandwidth of an optical fiber is the difference in frequency between a pair of band-edge frequencies in the power spectrum characteristic of the fiber. This characteristic is a measure of the fiber's output power in response to an impulse launched at an input end of the fiber. Typically, the band-edge frequencies are located at the half-power (i.e., −3 dB) points of the spectrum.

Cladding—The entirety of the fiber outside the core—as in conventional terminology, referring to the inorganic glass cladding produced during fiber drawing as an integral part of the fiber—not including applied organic coating(s).

Core—Innermost region of the fiber with primary responsibility for guiding—constituted of material of greater index of refraction than that of the cladding within which it is enclosed. In a common structure, using silica-based fiber, a core of updoped material is enclosed within a cladding of constant, lower index than that at any radial position within the core. Characteristic fiber structures consist of a germanium-doped silica core within a clad of undoped silica.

Differential Mode Delay (DMD)—Measure of the relative propagation delays among the various Modes of a lightwave traversing an optical fiber in its axial direction.

Mode—Independent, self-supporting, electromagnetic field, constituted of an electric field component and a magnetic field component, that propagates axially along an optical fiber independent of all other modes. Modes are identified in $LP_{n,m}$ nomenclature—in accordance with a convention for describing field shape of linearly polarized modes. In accordance with this nomenclature, "n" is the azimuthal mode number and "m" is the radial mode number. Consistent with common practice, the term is sometimes used as synonymous with "mode group" where suitable, e.g., where phase-velocity is described, and modal members of the group are of the same phase-velocity.

Multimode fiber—Fiber of core size sufficient to support a plurality of bound modes—characteristically from several hundred to 2000 modes—in addition to the fundamental mode.

DETAILED DESCRIPTION

The present invention discloses a method of preparing a preform having a predetermined refractive index profile along its length. In most cases it is desirable for the refractive index profile to remain constant over the entire length. Nevertheless, the present invention also contemplates fabrication of a preform whose refractive index profile changes in a predetermined manner along its length. This goal is accomplished by selectively etching different amounts of core material along an axial opening in the preform prior to collapsing it. Accordingly, the present invention applies to preforms that are fabricated with such an axial opening, e.g., those fabricated by Modified Chemical Vapor Deposition (MCVD), Plasma Chemical Vapor Deposition (PCVD), and by Outside Vapor Deposition (OVD) stand to benefit from the present invention. By way of illustration, and not limitation, the MCVD process is used to demonstrate an application of the invention.

Modified Chemical Vapor Deposition

Reference is made to FIG. 1 which shows an apparatus, designated generally by the numeral 100, for heating a glass substrate tube 33 to manufacture a core rod by the MCVD process. Specific details of the MCVD process are disclosed in U.S. Pat. No. 4,217,027 and in chapter 4 (particularly pages 156–162) of the textbook *Optical Fiber Telecommunications* II, Academic Press, Inc., © 1988 AT&T and Bell Communications Research, Inc.—both of which are hereby incorporated by reference.

The apparatus 100 includes a glass-working lathe 120 having a headstock 13 and a tailstock 14, which are each driven off a common shaft (not shown), and which are used to support the glass substrate tube 33 in such a manner that it can be rotated. A rotation speed of about sixty (60) revolutions per minute is contemplated. The substrate glass tube 33 is positioned in the lathe with one of its ends in the headstock 13 and with its other end connected by a welded joint 318 to an exhaust tube 319. The exhaust tube 319 is supported in the tailstock 14 of the lathe 120. In the MCVD process, a constantly moving stream of reactants (e.g., silicon tetrachloride) and oxygen is directed through the interior of the substrate tube 33. This stream includes dopants such as germanium to produce the desired index of refraction in the finished lightguide fiber. During each pass, doped reactants are moved into the tube from its headstock end while spent gases are exhausted at the tailstock end.

The lathe 120 also includes a carriage 110, which is mounted for reciprocal motion along the lathe. Mounted on the carriage 110 is a torch assembly which is designated generally by the numeral 130. The torch assembly 130 includes a housing 132 supported by a bracket 133 which, in turn, is supported from a post 135 that is mounted on carriage 110. The torch assembly 110 is adapted to cause a flow of combustible gasses to produce flames which are directed toward the tube 33. By confining the heat from the burning gases to a desired surface area of the tube, the torch assembly provides a reaction temperature (illustratively, 1700°–1900° C.) within a zone of heat. The mounting of the torch assembly 130 on the carriage 110 and its movement relative to the tube 33 causes the zone of heat to be moved along the length of the rotating tube. Through adjustment of the bracket 133, an operator may move the torch assembly 130 within any one of a range of distances from the tube 33 or to any one of a plurality of positions about and spaced from the tube.

The torch assembly 130 may be constructed to be either a surface-mix unit or a premix unit. In a surface-mix unit, each of the two combustible gasses is fed through the torch assemble 130 and are mixed together within a confinement provided between the torch assembly and the tube. On the other hand, in the premix unit, the combustible gasses are premixed prior to their flow through the torch assembly and into the vicinity of the confined tube 33. The housing 132 and its nozzles (not shown) may be cooled in order to provide a clean gas which prevents oxidation and resulting flaking of the material of which the housing and the walls are made. A coolant, such a chilled water, for example, is fed into conduits within the housing in order to provide the necessary cooling.

During the deposition process, the torch assembly 130 slowly traverses the length of the rotating tube 33 from the headstock end 13 of the lathe 120 toward its tailstock end 14 and then quickly returns to the headstock end. It is noted that reactant gasses are fed into an input port 311 at the headstock end and are exhausted from output port 312 at the tailstock end. However, in order to maintain a suitable amount of pressure within tube 33 to keep its diameter from varying, nitrogen is fed into exhaust port 312, although the net flow of gasses through the tube is from the headstock end to the tailstock end. Each pass of the torch assembly causes a single layer of silicon dioxide and dopants to be fused onto the inner wall of the tube. The composition of the various layers is determined by the composition of the reactant gasses and may be varied to obtain a gradation in index of refraction to obtain a desired profile.

Apparatus 100 may also include a machine-vision system mounted on the carriage 110 for causing the substrate tube 33 to have a central longitudinal axis 310-310 which is a straight line, and for measuring and controlling the outside diameter of the substrate tube. The machine-vision system comprises a source of laser light 140 and a detector 150 that are positioned on opposite sides of tube 33. Detector 150 includes a linear array of photo-diodes 151 that detect the shadow cast by the tube. Controller 160 responds to electrical signals from detector 150 to control the rotation speed of the tube and to control the gas pressure within the tube. The laser source 140 and the detector 150 are positioned to monitor that portion of the tube which has just been heated. Preferably, the source 140 and the detector 150 are positioned between the torch assembly 130 and the headstock 13 during deposition, and between the torch assembly 130 and the tailstock 14 during collapse. If the tube 33 is not perfectly straight, then its shadow will wobble up and down on the array of photodetectors 151. Controller 160 responds to such wobble by varying the rotation speed of the tube 33 according to its angular position. Output 162 provides an electrical signal for controlling rotation speed. As one might expect, rotation speed is slower when the angular position of the tube is such that it is bowed upward; and rotation speed is faster when the angular position of the tube is such that it is bowed downward. Accordingly, gravity is used to straighten the tube. Detector 150 also monitors the diameter of tube 33. In the event that the diameter is smaller than desired, controller 160 responds on output 161 by increasing the pressure of oxygen flow into port 312. In the event that the diameter is larger than desired, controller 160 responds on output 161 by decreasing the pressure of oxygen flow into port 312. In either situation, the net flow of gasses through the tube 33 is still in the direction from the headstock 13 toward the tailstock 14.

Following the deposition of core and cladding materials, the substrate tube 33 is collapsed to form a solid core rod by heating it to a higher temperature than during deposition. The wall of the tube 33 is pinched together adjacent to its tailstock end to prevent the entry of moisture and other contaminants into the tube while it is being collapsed. During collapse, the torch assembly 130 now moves from tailstock to headstock in a number of passes. At the end of each pass, the carriage 110 is returned rapidly to the tailstock to commence another cycle. Although the direction of travel of the torch assembly 130 in its operative condition during the collapse mode is preferably opposite to that in the deposition mode, it may be the same. In that event, the tube 33 is not pinched off completely at the tailstock end in order to allow for the removal of gases. Otherwise, an undesirable pressure build-up in the tube could occur.

Tube Collapse Procedure

The collapse procedure usually starts with a series of shrinking passes in the same direction as the deposition. During collapse, a rotation speed of about forty-three (43) revolutions per minute is used. The laser 140 and detector 150 are positioned to follow the torch assembly 130. When the bore of the tube 33 is sufficiently small, one or more etching passes are carried out to remove a small amount of material from the inside surface. This material has been depleted of germanium during the previous shrinking passes and, if incorporated into the final collapsed rod, would cause a center dip in the refractive index profile. $SF_6$ is the preferred etching gas, although $C_2F_6$ may be used, along with $O_2$ and $Cl_2$, and the etching passes are again in the original deposition direction. (This etching step is one reason why one cannot simply close the tailstock end of the tube 33 after deposition and perform all the collapse passes from tail to head.) Several more shrinking passes may follow the etch passes. The tube 33 is sealed at the tailstock end and the collapse is finished with one or more passes in the tail-to-head direction with the laser source 140 and detector 150 still following the torch assembly 130.

If wobble control is employed, then the laser source 140 and detector 150 are switched to the opposite side of the torch assembly 130 prior to or during the first pass in the collapse mode. This may be done manually or automatically. The laser 140 and detector 150 need to be positioned on the side of the torch assembly where the tube is softer and, thus, more susceptible to being shaped.

Improving Axial Uniformity

Figure 2:
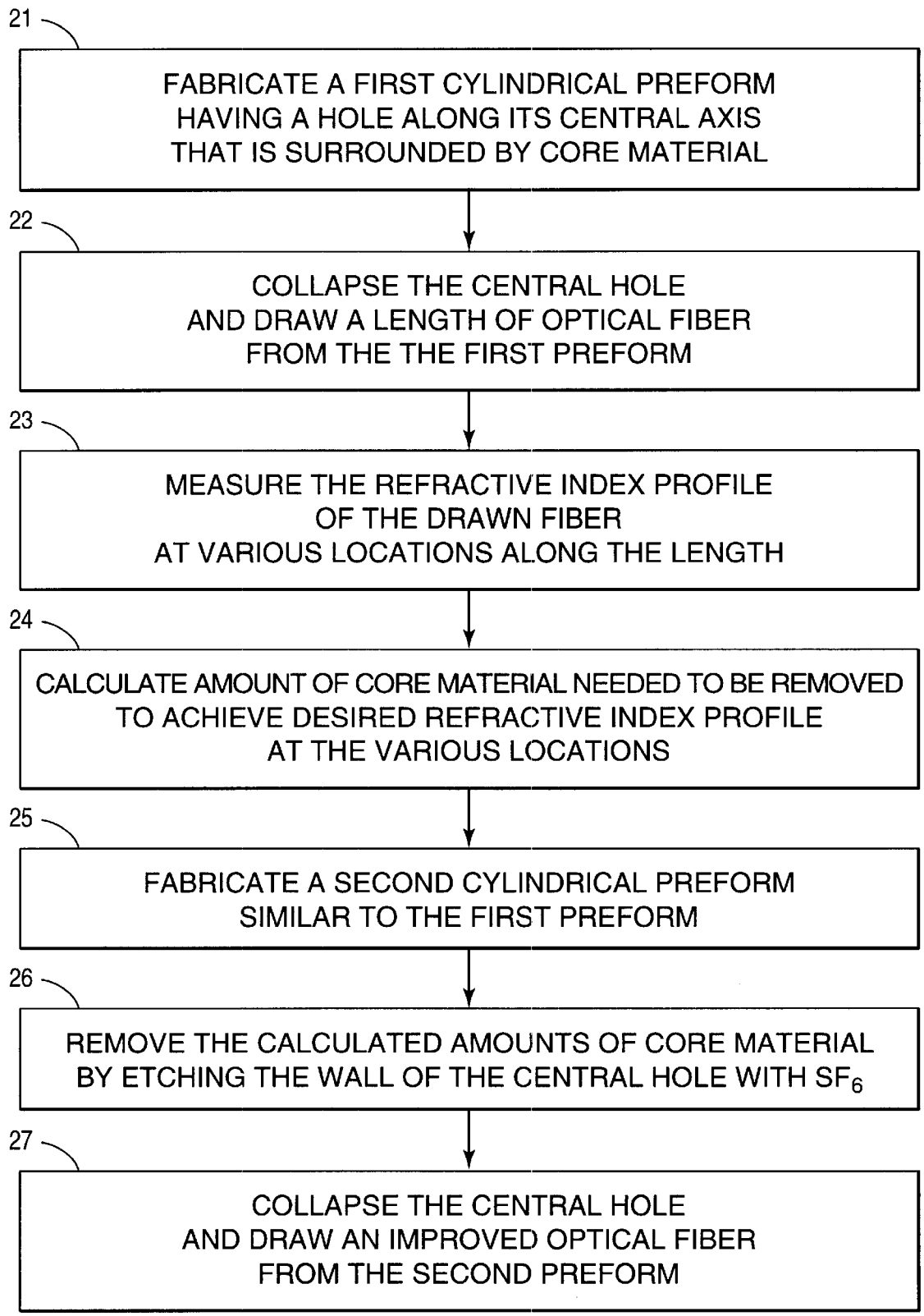
FIG. 2 is a flow diagram showing the steps used in the present invention.

Reference is made to FIG. 2, which shows the various steps that are performed in fabricating an optical fiber having a refractive index profile that is more uniform in the axial direction than has been possible heretofore. In an illustrative embodiment, a multimode optical fiber having a generally parabolic profile (i.e., $\alpha \approx 2$) is disclosed. Nevertheless, it is understood that the present invention applies equally to singlemode optical fibers.

In the multimode fiber example of the present invention, the $\alpha$ value that describes the shape of the refractive index profile is determined from bandwidth measurements. In multimode fibers, as the alpha value increases, the peak bandwidth shifts to lower wavelengths. Therefore, by removing glass from the center portion of a multimode preform, the alpha value also increases. The selective etching is determined by first producing fiber from a precursor preform without using this invention (steps 21–22) and measuring the refractive index profile as a function of axial position (step 23). One can then determine how much glass must be removed from the center portion of subsequent preform cores as a function of axial position along the length of the preform to produce fiber with an axially uniform refractive index profile. Once the required amount of core removal are determined (step 24), subsequent preforms that are similar to the precursor preform(s) are fabricated (step 25); the calculated amounts of core material are removed from the wall of its central hole by etching with $SF_6$, for example (step 26); and the central hole is collapsed either during or after etching (step 27). Thereafter, optical fiber having a refractive index profile with improved axial uniformity is drawn.

In accordance with a preferred embodiment of the present invention, plural precursor preforms are fabricated in order to establish an etching procedure, which will be used to make improved preforms. The precursor preforms are fabricated with a refractive index profile that comes as close as possible to the desired index profile using the above-described Multiple Traverse Speed tuning algorithm. Thereafter, fibers are drawn from the precursor preforms, and refractive index profiles are measured at various locations along their lengths. The measured profiles are then averaged and used to determine the cross-sectional area that needs to be removed from the various locations along the inner wall of subsequent preforms to transform their refractive index profiles into desired refractive index profiles.

The refractive index profile (i.e., alpha value) of the fiber drawn from each precursor preform is not measured directly. Rather, it is calculated from bandwidth measurements that are made at three different wavelengths (850 nm, 1300 nm, and 1550 nm). The alpha value of a spool of fiber is determined by minimizing the function:

$$\sum_{\lambda} \left( BW(\lambda) - \frac{k}{\sqrt{S(\alpha, \lambda)^2 + F}} \right)^2 \quad (2)$$

where: $BW(\lambda)$=the measured bandwidth of the fiber at a specific wavelength;
  k=a constant relating the fiber bandwidth to the fiber dispersion; and
  $\sqrt{S(\alpha,\lambda)^2+F}$=the dispersion of the fiber.

The summation in (2) is for the three wavelengths at which the bandwidth measurements were made. The dispersion of the fiber, $\sqrt{S(\alpha,\lambda)^2+F}$, can be calculated. $S(\alpha,\lambda)$ is the theoretical intermodal dispersion for a power-law alpha profile and assumes equal excitation of all modes. F is the profile dispersion. In order to minimize (2), values of $\alpha$ and F are chosen and (2) is solved. Equation (2) is minimized using standard minimization algorithms. Once a minimum of (2) is found then the values of a and F that minimized (2) are assigned to that particular spool of fiber.

Figure 3:
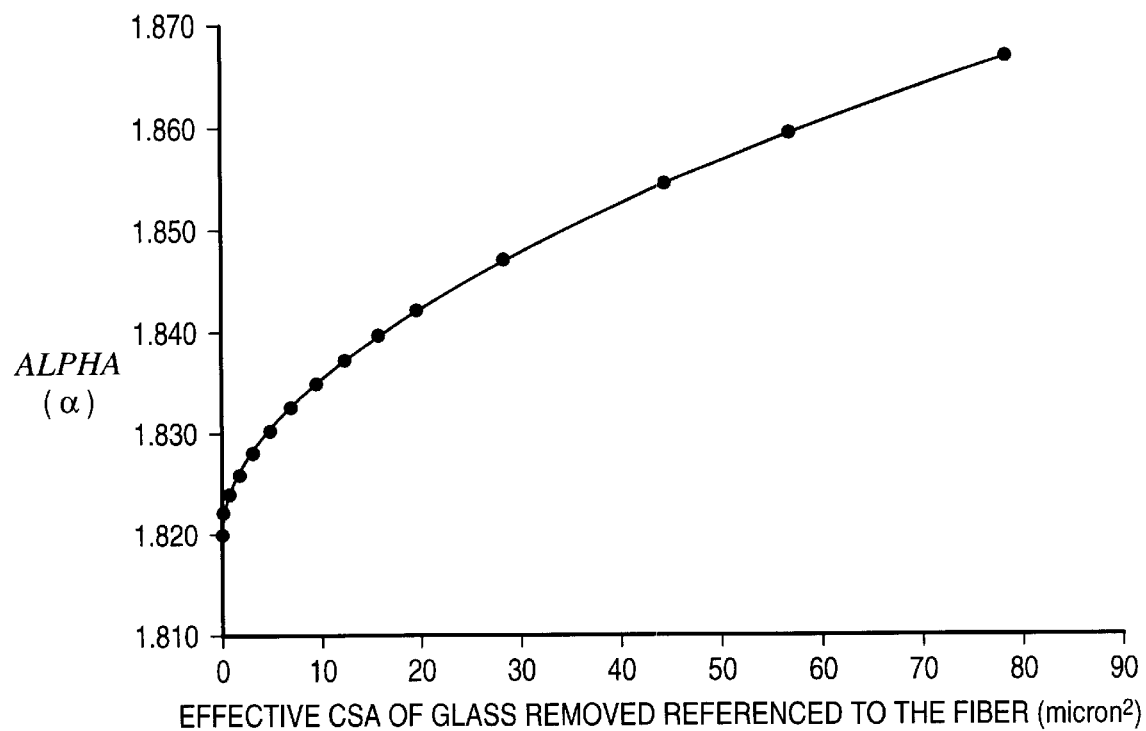
FIG. 3 is a graph showing the increase in the value of alpha as a function of the amount of glass removed from the center portion of a preform.
Figure 4:
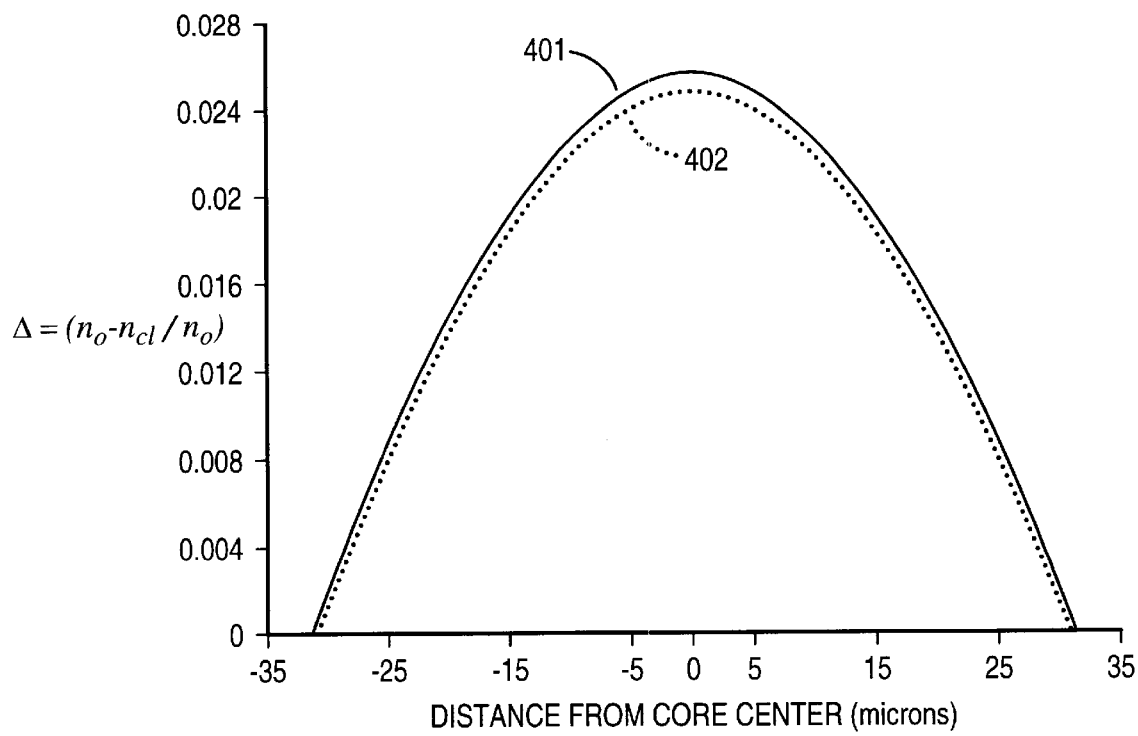
FIG. 4 is a graph showing how the shape, as defined by the alpha value, of the shape refractive index profile changes as glass is removed from the center portion of a preform.

The curve shown in FIG. 3 demonstrates how the value of a increases as glass is removed from the center portion of a multimode fiber. Whereas the glass removed from the center of a drawn fiber in FIG. 3 has cross-section area (CSA) in the $(\mu m)^2$ range and a circular shape, the present invention contemplates the removal of core material from the preform having a CSA in the $(cm)^2$ range and a "donut" shape. Nevertheless, the effect of removing a small amount of core material from the center of a multimode optical fiber having a core diameter is 62.5 $\mu m$ is demonstrated in FIG. 4. Curve 401 represents the refractive index profile of a multimode fiber where $\alpha$=1.82. After removing 78.54 $\mu m^2$ of core material from the center of the fiber, the refractive index profile is represented by curve 402 where $\alpha$=1.867.

Selective Etching

Improved control of the refractive index profile and/or the core diameter along the length of optical preforms allows one to manufacture fiber that is closer to theoretically calculated "ideal" profiles. The improved refractive index control and/or core diameter control along the length of optical preforms provided by the invention makes it easier to manufacture multimode and singlemode fibers with enhanced performance. Unlike the prior art techniques discussed above (e.g., U.S. Pat. No. 5,993,899), the present invention uses selective etching to control axial bandwidth and $\alpha$ trend along the length of multimode preforms.

Experiments were performed to relate the amount of glass removed to the etchant flow-rate. The data from these experiments resulted in an expression relating the amount of glass removed to the etchant concentration and the torch traverse speed during the etch process. To make the experiments simpler and to relate the amount of glass removed to the etchant flow-rate, an ideal gas mixture was assumed and the total gas flow-rate was fixed at 200 standard cubic centimeters per minute (sccm). The difference between 200 sccm and the set etchant flow-rate was made up by flowing $O_2$. The form of the equation relating the amount of glass removed to the etchant flow-rate and the torch traverse speed during the etch process is:

$$G = k \times \frac{Q}{v} \quad (3)$$

where: G=the cross-sectional area of glass removed ($cm^2$),
  k=a proportionality constant that depends on the glass surface temperature during the etch process,
  Q=the etchant flowrate (sccm), and
  v=the torch traverse speed during the etch process (cm/min).

In the experiments the total gas flow-rate during the etch process was 200 sccm, therefore we can relate Q, the etchant flowrate during the etch process, to the etchant concentration during the etch process by using the ideal gas law and the formula:

$$X_{etchant} = \frac{Q}{200} \quad (4)$$

where: $X_{etchant}$=the etchant mole fraction during the etch process and the number 200 refers to the total gas flowrate during the etch process.

The concentration of the etchant during the etch process is determined by:

$$[Etchant] = X_{etchant} \times \frac{P}{RT} \quad (5)$$

where: [Etchant]=the etchant concentration;
  P=the total gas pressure;
  T=the temperature of the gas mixture; and
  R=the ideal gas constant.

By conducting several etch experiments at the same glass surface temperature and the same etchant flowrate and concentration, but by using different torch traverse speeds for each experiment the value of the proportionality constant was determined. More experiments were conducted at the same glass surface temperature and some of the same torch traverse speeds during the etch process as the first set of experiments, but a different etchant flowrate and concentration were used. From these second set of experiments the value of the proportionality constant was found to be the same as the proportionality constant for the first set of experiments. If the glass surface temperature was changed then the proportionality constant would change and the new value would have to be determined.

From these experiments and the theoretical calculations we could relate the value of $\alpha$ to the amount of glass removed from the center of a preform, and then given an etchant flow-rate and/or an etchant concentration and knowing P/RT, we could calculate the torch traverse speed during the etch process required to remove the amount of glass that would give us the desired increase in the alpha value. Similarly, given a torch traverse speed during the etch process we could calculate the etchant flow-rate and/or the etchant concentration (knowing P/RT) required to remove the desired amount of glass to give us our desired increase in $\alpha$.

Figures 5, 6:
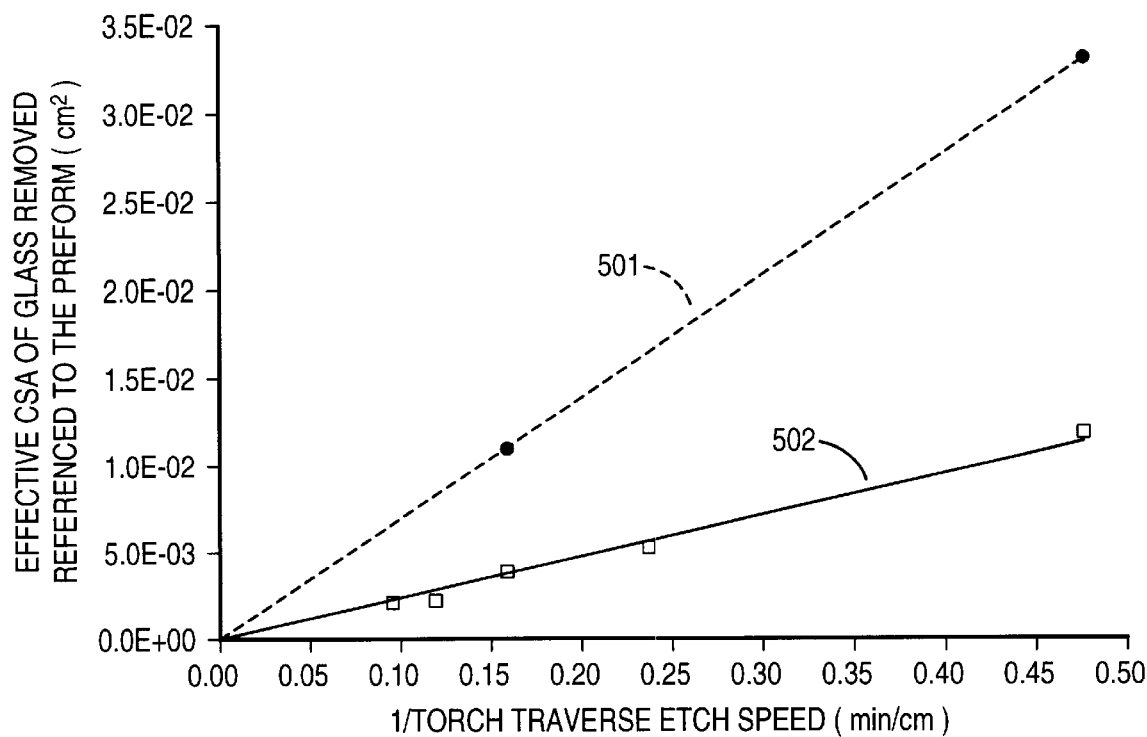
FIG. 5 discloses the cross-sectional area of glass removed from the center portion of a preform as a function of the etchant flow-rate and torch traverse speed.
FIG. 6 shows the axial alpha trend for three standard preforms and two preforms using the present invention.

In the experiments that were conducted to develop the present invention, the etchant used was $SF_6$. However, the present invention is not restricted to $SF_6$ and any etchant (e.g., $C_2F_6$) could be used. Shown in FIG. 5 are the experimental results relating the amount of glass removed to the $SF_6$ flow-rate and the torch traverse speed during the etch process. Curve 501 is for an $SF_6$ flow-rate of 54 sccm while curve 502 is for an $SF_6$ flow-rate of 18 sccm. Using linear equations that best fit the two data sets in the form of equation (3), the average proportionality constant, k, in (3) becomes approximately $1.3 \times 10^{-3}$.

It is recommended, but not necessary to use etching temperatures where the tube does not collapse. In the preferred embodiment, an etching temperature of approximately 1800° C. was used, which is several hundred degrees below the glass collapse temperature. This lower temperature is important because it minimizes fluorine diffusion into the glass and the volatilization of the dopants. It also separates the collapsing process from the etching process making it easier to control both processes.

After the invention has been applied, either another etching step can be used to eliminate any central defects in the central portion of the preform as described in application Ser. No. 09/488,088 "Method of Preparing Preforms for Optical Fibers," or the central duct can be closed at the exhaust end of the preform while flowing a maximum of 300 sccm of $O_2$ to the tube. This flow is reduced to zero as the duct is closed. Finally, the tube is collapsed into a solid rod. The central duct is closed along the length of the preform using a final collapse pass in the direction of the tube exhaust to the tube intake using a torch traverse speed of approximately 1.3 cm/min. The temperature during this process is approximately 2200±100° C. in the portion of the preform being collapsed. The entire collapse and etch process takes a few hours to several hours depending on the diameter, composition and length of the tube.

FIG. 6 shows the axial alpha trend for three precursor preforms 603–605, and two preforms 601–602 using the present invention, each of the preforms having a nominal length of one meter. The present invention was applied between preform positions 36 cm and 74 cm on preforms 601–602, where the intake end of the preform is at 0.0 cm and the exhaust end is at 100 cm. Whereas the alpha trend is substantially flat over the entire 36–74 cm region for preform 601, the alpha trend for preform 602 in the 30–50 cm region appears to vary considerably. This is attributable to the fact that no data point was taken in the 30–50 cm for preform 602, and the curve fitting program used assumes gradual change, which may not be the case. More importantly, it is noted that even though there is wide variation in alpha trend among the precursor preforms 601–603, selective etching according to the present invention flattens the alpha trend. It also appears that etching in general tends to smooth out variations among preforms.

Controlling axial trends in the core of optical fiber is difficult. The present invention helps control and minimize axial trends along the length of optical preforms. The invention can be used to control the axial bandwidth and alpha trend along the length of multimode preforms. It can also be used to control fluctuations of the core diameter in both singlemode and multimode preforms. Fluctuations in the core diameter and shape in both multimode and singlemode preforms can result in lower product yields and inconsistent fiber performance.

Using this invention to manufacture graded index multimode fiber, the refractive index profile along the length of the preform can be tuned such that all the fiber from a preform, including fiber near the ends, meets the bandwidth specifications. This invention allows one to manufacture preforms with any specifically desired axial alpha profile, whether it is uniform or non-uniform. The present invention can also be used to control the core diameter along the axial length of both multimode and singlemode preforms.

Although various particular embodiments of the present invention have been shown and described, modifications are possible within the scope of the invention. These modifications include, but are not limited to: the use of OVD or PCVD processes to fabricate the preform; the use of etchants other than $SF_6$; and the use of the inventive process to control the core size in both multimode and singlemode fibers.

What is claimed is:

1. Process for fabricating an optical preform having a desired index profile that is uniform in the longitudinal direction, said process comprising the following steps:
   (i) depositing successive layers of core material onto the interior wall of a precursor glass tube, said core material having a refractive index profile whose magnitude varies from the outer deposited layers to the inner deposited layers;
   (ii) collapsing the central hole of the precursor glass tube to form a precursor optical preform, and drawing a length of fiber therefrom;
   (iii) determining the refractive index profile of the core of the drawn fiber at various locations along its length;
   (iv) calculating the amount of core material that needs to be removed from the inner deposited layers at locations of the precursor perform corresponding to each of the various locations to convert the index profile of the precursor preform into the desired index profile;
   (v) depositing successive layers of core material onto the interior wall of a second glass tube, said core material having a refractive index profile whose magnitude varies from the outer deposited layers to the inner deposited layers in a manner substantially identical to the profile of a precursor optical preform; and
   (vi) removing the calculated amounts of core material from the inner deposited layers of the second glass tube at locations corresponding to each of the locations of the precursor preform, and collapsing the central hole of the second glass tube to form the second optical preform.

2. The process of claim 1 further including
   repeating steps (i), (ii), (iii) and (iv) on a plurality of precursor preforms to obtain an average calculation of the amount of core material that needs to be removed from the inner deposited layers at each of the various locations;
   depositing successive layers of core material onto the interior wall of a third glass tube; and
   removing the average calculated amount of core material from the inner deposited layers of the third glass tube at locations corresponding to each of the locations of the plurality of precursor performs, and collapsing the central holes of the second glass tubes to form a plurality of second optical performs.

3. The process of claim 1 further including the step of:
   drawing an optical fiber from the second optical preform.

4. The process of claim 1 wherein the second optical preform is for a multimode fiber.

5. The process of claim 1 wherein the desired index profile is approximately parabolic.

6. The process of claim 1 wherein the step of removing the calculated amounts of core material is carried out by gaseous etching.

7. The process of claim 6 wherein the step of gaseous etching is completed prior to collapsing the second glass tube.

8. The process of claim 6 wherein the etchant gas comprises $SF_6$.

9. The process of claim 1 wherein the step of determining the refractive index profile of the optical fiber at different locations along its length comprises the following steps:

measuring the bandwidth of the optical fiber at different locations along its length; and converting the bandwidth measurements into measures of the refractive index profile.

10. A method for fabricating an optical fiber preform having a predetermined refractive index profile along its length comprising the following steps:

fabricating a first multimode optical preform having a central hole in the longitudinal direction that is surrounded by core material having a refractive index, which varies in the radial direction;

collapsing the central hole in the first preform and drawing a length of optical fiber therefrom;

determining the refractive index profile of the core of the drawn fiber at various locations along its length;

calculating the different amounts of core material that need to be removed from the first preform at different locations along its length to make its refractive index profile similar to the predetermined desirable refractive index profile;

fabricating a second multimode optical preform having a refractive index profile, which is similar to that of the first optical preform, said second preform having a hole along its central axis that is surrounded by core material;

removing the calculated different amounts of core material surrounding the central hole in the second preform at locations along its length corresponding to the different locations of the first perform; and collapsing the central hole in the second preform.

11. The method of claim 10 wherein the step of determining the refractive index profile of the optical fiber at different locations along its length comprises the following steps:

measuring the bandwidth of the optical fiber at different locations along its length; and converting the bandwidth measurements into measures of the refractive index profile.

12. The method of claim 10 further including the step of drawing a length of fiber from the second preform.

13. The method of claim 10 wherein the step of removing the core material surrounding the central hole in the second preform is accomplished by gaseous etching.

14. The method of claim 10 wherein the step of fabricating the first and second optical preforms is accomplished by modified chemical vapor deposition.

15. The method of claim 10 wherein the step of removing different amounts of core material surrounding the central hole is accomplished by causing a torch to traverse the preform in the axial direction at a substantially constant speed;

flowing an etchant gas through the central hole in the preform; and varying the concentration and/or flow rate of the etchant gas as a function of the axial location of the torch in order to achieve different amounts of etching at different axial locations.

16. The method of claim 15 wherein the etchant gas comprises $SF_6$.

17. The method of claim 10 wherein the step of removing different amounts of core material surrounding the central hole is accomplished by causing a torch to traverse the length of the preform in the axial direction;

flowing an etchant gas through the central hole in the preform; and varying the torch-traverse speed as a function of its axial location along the length of the preform in order to achieve different amounts of etching at different axial locations.

18. The method of claim 17 wherein the etchant gas comprises $SF_6$.

19. A method for fabricating a multimode optical preform having a desired refractive index profile that is relatively uniform along its length comprising the following steps:

fabricating a first optical preform having a central hole in the longitudinal direction that is surrounded by core material whose refractive index decreases as the radial distance from the central hole increases;

collapsing the central hole in the first preform and drawing a length of optical fiber therefrom;

measuring the bandwidth of the drawn fiber at various locations along its length;

fabricating a second multimode optical preform having a refractive index profile, which is similar to that of the first optical preform, said second preform having a hole along its central axis that is surrounded by core material;

flowing an etchant gas through the hole in the second preform while a torch traverses the length of the second preform in the axial direction;

causing the etchant gas to remove different amounts of core material from the hole at locations along the length of the second preform corresponding to the various locations of the fiber drawn from the first preform according to the differences between the measured bandwidth at the various locations and the desired bandwidth of the fiber drawn from the first preform; and collapsing the central hole in the second preform.

20. The method of claim 19 wherein the etchant gas comprises $SF_6$.

21. The method of claim 19 wherein different amounts of core material removal are achieved by varying the concentration of the etchant gas as a function of the axial location of the torch.

22. The method of claim 19 wherein different amounts of core material removal are achieved by varying the flow rate of the etchant gas as a function of the axial location of the torch.

23. The method of claim 19 wherein different amounts of core material removal are achieved by varying the torch traverse speed as a function of its axial location.

24. The method of claim 19 further including the step of drawing a length of fiber from the second preform.

* * * * *